United States Patent [19]

Yamamoto et al.

[11] Patent Number: 5,783,287
[45] Date of Patent: *Jul. 21, 1998

[54] METHOD OF INSERT MOLDING PLASTIC PARTS TO PROVIDE COVERED EDGE SURFACES AND PLASTIC PARTS MADE THEREBY

[75] Inventors: Hiroaki Yamamoto; William Hardgrove, both of Brookville, Ohio

[73] Assignee: Green Tokai Co., Ltd., Brookville, Ohio

[*] Notice: The term of this patent shall not extend beyond the expiration date of Pat. No. 5,599,608.

[21] Appl. No.: 720,695

[22] Filed: Oct. 2, 1996

Related U.S. Application Data

[60] Provisional application No. 60/000,335, Jun. 20, 1995.

Related U.S. Application Data

[63] Continuation of Ser. No. 506,362, Jul. 24, 1995, Pat. No. 5,599,608.
[51] Int. Cl.$^6$ ........................................ B32B 9/00
[52] U.S. Cl. ...................... 428/192; 428/35.7; 428/120; 428/121; 428/131; 428/132; 428/136; 428/140; 428/306.6; 428/322.2; 428/349; 428/311.31; 264/46.4; 264/46.5; 264/46.7; 264/132; 264/247; 264/313; 264/510; 156/233; 156/238; 156/257
[58] Field of Search .................. 428/192, 35.7, 428/136, 121, 132, 120, 131, 140, 306.6, 322.2, 349, 311.31; 264/46.4, 46.7, 132, 46.5, 313, 510, 247; 156/233, 238, 245, 257

[56] References Cited

U.S. PATENT DOCUMENTS

| | | | |
|---|---|---|---|
| 5,087,488 | 2/1992 | Cakmakci | 428/31 |
| 5,100,728 | 3/1992 | Plamthottam et al. | 428/345 |
| 5,108,681 | 4/1992 | Cakmakci | 264/151 |
| 5,203,941 | 4/1993 | Spain et al. | 156/209 |
| 5,240,751 | 8/1993 | Cakmakci | 428/31 |
| 5,242,650 | 9/1993 | Rackovan et al. | 264/509 |
| 5,264,172 | 11/1993 | Rosica et al. | 264/132 |
| 5,456,307 | 10/1995 | Mouri | 164/446 |

*Primary Examiner*—Patrick Ryan
*Assistant Examiner*—Abraham Bahta
*Attorney, Agent, or Firm*—Biebel & French

[57] ABSTRACT

A method for molding a plastic part comprises preforming a film laminate and insert molding a plastic substrate against the film laminate. According to one embodiment, the film laminate is preformed with re-entrant edge portions. The insert molding step involves positioning the film laminate in a mold cavity, closing the mold and injecting molten resin into the mold cavity against the film laminate. The force of the closing of the mold and the injection of the resin causes the re-entrant edge portions to curl up under the solidifying resin to ensure complete coverage of the longitudinal edges of the plastic substrate by the film laminate. According to another embodiment, a stencil of an image is made in the film laminate prior to the insert molding. The resin injected into the mold flows into the stencil so that the image is visible against the surrounding surface of the film laminate.

8 Claims, 3 Drawing Sheets

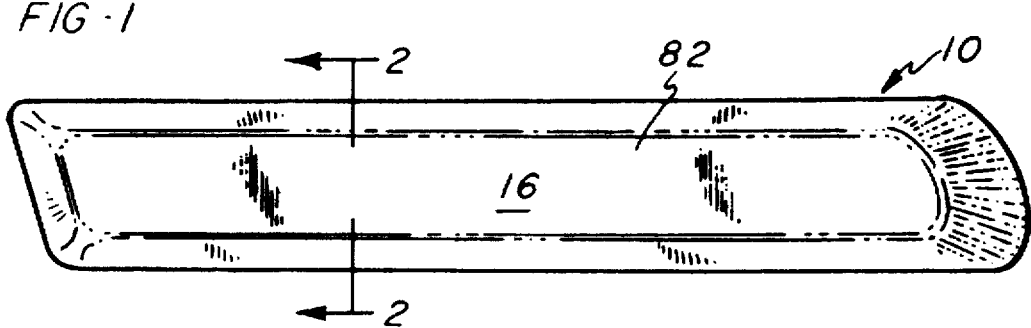
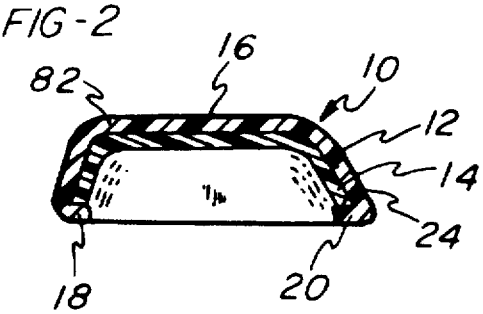
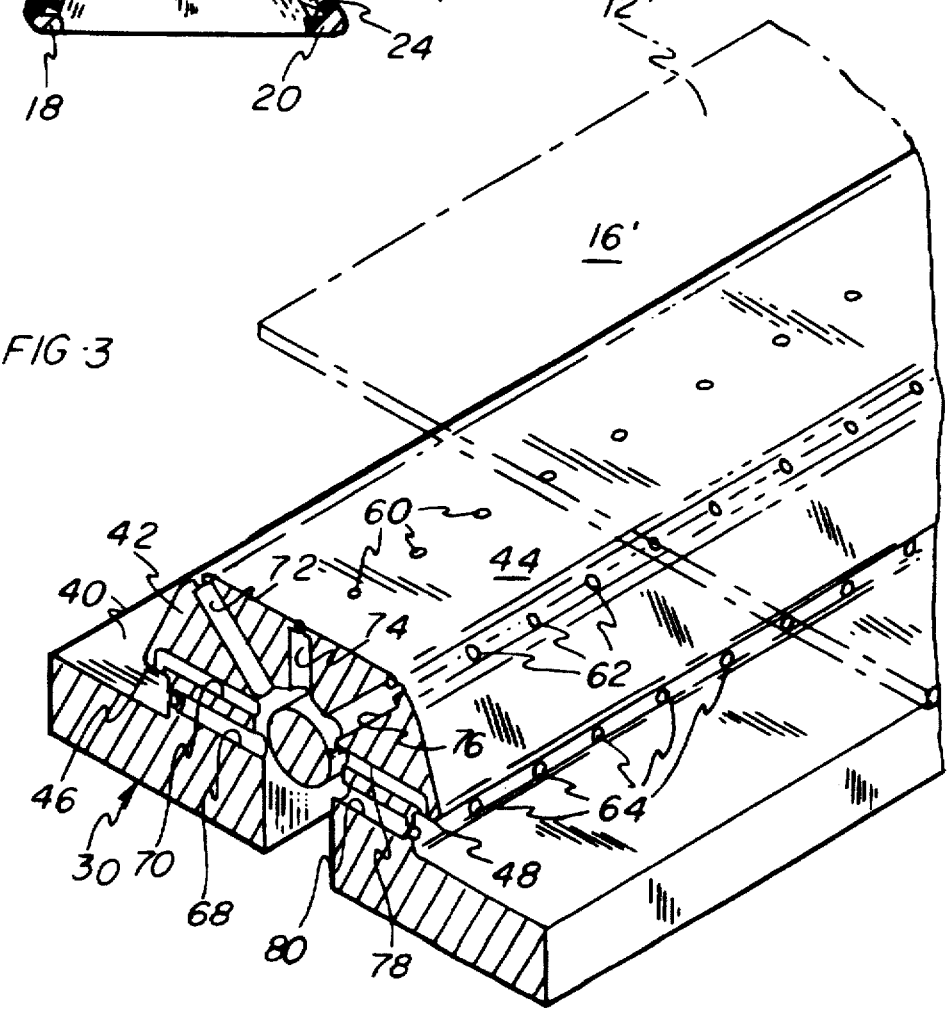

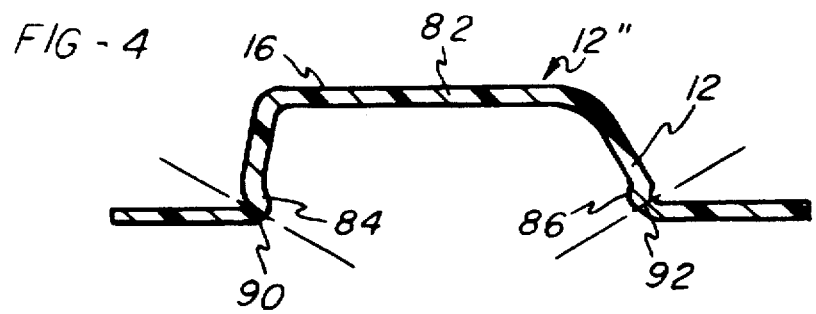
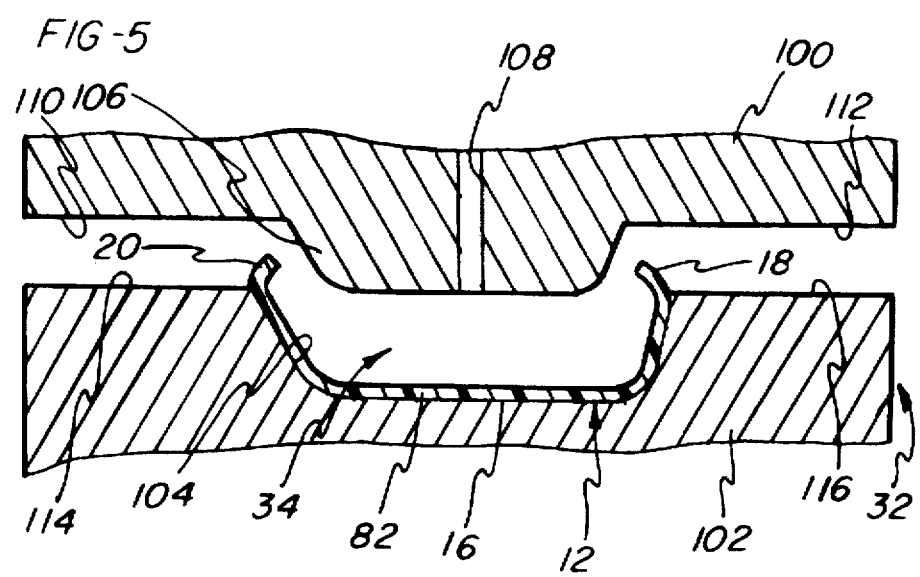
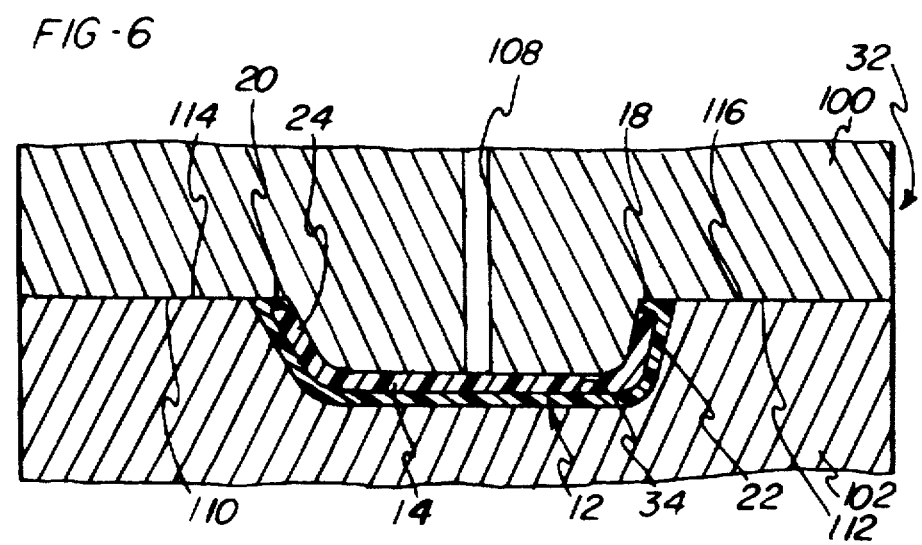

METHOD OF INSERT MOLDING PLASTIC PARTS TO PROVIDE COVERED EDGE SURFACES AND PLASTIC PARTS MADE THEREBY

This is a continuation of application Ser. No. 08/506,362 filed on Jul. 24, 1995, now U.S. Pat. No. 5,599,608.

CROSS-REFERENCES TO RELATED APPLICATIONS

Which claims the benefit of the co-pending U.S. Provisional Application entitled "Method of Insert Molding Plastic Parts to Provide Covered Edge Surfaces and Plastic Parts Made Thereby," Ser. No. 60/000,335 filed Jun. 20, 1995, abandoned, is claimed.

BACKGROUND OF THE INVENTION

1. Field of the Invention

The present invention pertains to improved methods for insert molding a laminated film or the like over a plastic substrate and to fused film-plastic parts made thereby.

2. Description of the Related Art

A variety of injection molded parts have been made and used for automobile body and trim parts. For example, bumpers, body panels, doors, filler panels, wheel covers, dashboards, arm rests and other parts have been made via injection molding techniques. Additionally, with regard to automobile exteriors, body side moldings, beltline moldings, roof moldings and window moldings have been made via injection molding of polyvinylchloride (PVC) or other thermoplastic materials.

In order to provide a painted surface for these parts, film lamination techniques have been successfully employed. In accordance with these processes a paint film laminate is insert molded with the desired thermoplastic to fuse the film over the injection molded part. The resulting injection molded part is ready for assembly without subsequent painting.

The paint film laminate used in these insert molding techniques may comprise a backing sheet of about 0.020" in thickness to which paint layers are adhered to form a colored side of the laminate. Typically, the backing sheet comprises an extruded thermoplastic sheet.

In such paint film laminates, a paint film, comprising a cast dried continuous paint coating, is provided over the backing sheet. The paint film may consist of a monocoat, a clear coat over a base coat or a clear coat and a base coat with interposed print or design. The paint film, including base coat, clear coat and print or design, if desired, may range from about 0.5–4 mil. in thickness.

The laminated paint films are available, for example, from Avery Dennison, Automotive Division or Rexham Decorative Products, Charlotte, N.C. The films are typically provided in a roll, unwound, then trimmed to a proper "preform" size and shape, ready for insertion into the injection mold. The preform is usually placed along the cavity side of the mold with the painted side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and film occur. Injection molds used for these processes are rear or edge gated so that the molten resin is directed along the backside of the film.

Although these processes provide significant advantage, they are not without problem. For example, edgewise portions of the part, such as the longitudinally extending edges of elongated strips used for body moldings, may not be completely covered with the film. Accordingly, these edges reveal the uncovered plastic substrate and provide an aesthetically displeasing appearance since the continuity of the printed surface is interrupted by the unsightly appearance of the underlying plastic substrate.

Techniques for preforming paint film laminates and insert molding laminated plastic parts are disclosed in U.S. patent application Ser. No. 08/372,230 to Yamamoto, filed Jan. 13, 1995, and U.S. patent application Ser. No. 08/393,169 to Yamamoto, filed Feb. 21, 1995. The disclosure of both applications is incorporated herein by reference. Nonetheless, there remains a need in the art for improved methods for insert molding of a film laminate over a plastic substrate in such manner that the longitudinal edge portions of the substrate are covered by the film.

SUMMARY OF THE INVENTION

These and other objects of the invention are met by the instant methods and fused film-plastic parts made thereby.

Briefly, the method includes the steps of preforming a film laminate and insert molding a plastic substrate against the preformed laminate. The preforming step involves shaping a unformed film and trimming the shaped film to obtain the film laminate. The insert molding step involves positioning the film laminate in a mold cavity, closing the mold and injecting molten thermoplastic or thermosetting resin into the mold cavity against the film laminate. The film laminate is preformed with re-entrant longitudinal edge portions, and the force of the closing of the mold and the injection of the resin causes these re-entrant longitudinal edge portions to curl up under the plastic to ensure complete coverage of the longitudinal edges of the plastic substrate by the film laminate when the plastic substrate solidifies.

Another aspect of the invention relates to a method for making a fused film-plastic part having a logo or design visible through the film laminate. According to this method, cut-outs forming the image of the logo or design are made in the film prior to insert molding the part. In one embodiment, these cut-outs are made in the unformed film prior to preforming. When the preformed film laminate is placed in the mold cavity and the resin is injected, the resin enters the cut-outs. The resin which enters the cut-outs solidifies generally flush with the outer surface of the film laminate so that the logo or design is visible against the surrounding film laminate surface.

The invention will be further described in conjunction with the appended drawings and following detailed description.

BRIEF DESCRIPTION OF THE DRAWINGS

FIG. 1 is a plan view of a fused film-plastic part made in accordance with the invention;

FIG. 2 is a sectional view of the fused film-plastic part taken along line 2—2 of FIG. 1;

FIG. 3 is a sectional view of a pattern block for preforming film for use in making the fused film-plastic part of FIG. 1;

FIG. 4 is a sectional view of the film preformed on the pattern block of FIG. 3;

FIG. 5 is a schematic view of a mold for the plastic portion of the fused film-plastic part of FIG. 1 opened to receive the film;

FIG. 6 is a schematic view of the mold of FIG. 5 closed to insert mold the film and plastic portions of the fused film-plastic part;

DETAILED DESCRIPTION OF THE PREFERRED EMBODIMENT

Figure 7:
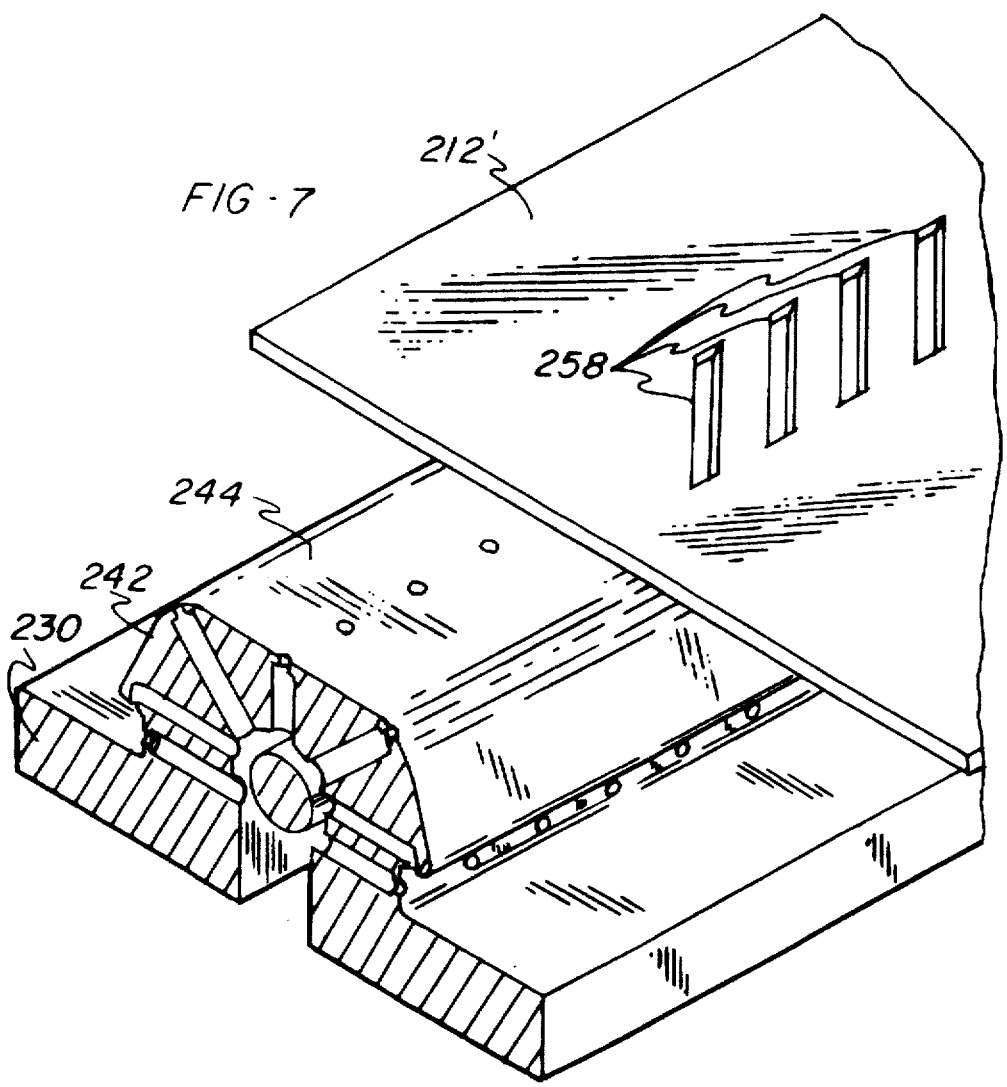
FIG. 7 is a sectional view of the pattern block of FIG. 3 illustrating the preforming of a film having cut-outs for displaying a logo or design when the fused film-plastic part is insert molded.

Referring initially to FIGS. 1 and 2 of the drawings, a body side molding 10 made in accordance with the present invention includes a paint film laminate 12 fused to an elongated plastic substrate 14. The paint film laminate 12 has an outer surface 16 having a desirable color and finish. As a result of the method of the present invention, re-entrant longitudinal edge portions 18, 20 of the film laminate 12 are curled under the adjacent longitudinal edges 22, 24 of the plastic substrate 14 to ensure complete coverage of the plastic substrate 14 by the film laminate 12.

A method for producing the body side molding 10 is illustrated in FIGS. 3-6. Briefly, the method includes the steps of preforming the film laminate 12 (FIGS. 3 and 4) and insert molding the plastic substrate 14 against the preformed laminate 12. The preforming step involves shaping an unformed film 12' on a pattern block 30 (FIG. 3) and trimming the shaped film 12" to obtain the film laminate 12 (FIG. 4). The insert molding step involves positioning the film laminate 12 in a mold 32 (FIG. 5), closing the mold and injecting molten thermoplastic or thermosetting resin into the mold cavity 34 against the film laminate 12. The film laminate is formed with re-entrant longitudinal edge portions 18, 20, and the force of the closing of the mold and the injection of the plastic causes these re-entrant longitudinal edge portions to curl up under the plastic to ensure complete coverage of the longitudinal edges 22, 24 of the plastic substrate 14 by the film laminate 12 when the plastic substrate 14 solidifies.

FIG. 3 illustrates a pattern block 30 for use in preforming the film laminate 12 (FIG. 4) prior to insert molding. The pattern block 30 consists of a body 40 defining one or more elongated parallel forms 42 (only one shown in FIG. 3). As shown in FIG. 3, the form 42 has an upper surface 44 bounded at either longitudinal end by two re-entrant grooves 46, 48. The upper surface 44 defines a contour corresponding to the outer contour of the finished body side molding 10 (FIGS. 1 and 2).

The form 42 includes several lines of vacuum ports 60, 62, 64 (only three lines shown in FIG. 3) extending longitudinally along the upper surface 44 and re-entrant grooves 46, 48 of the form 42. These lines of vacuum ports 60, 62, 64 communicate with a plenum 66 by means of conduits 68, 70, 72, 74, 76, 78, 80. The plenum 66, in turn, communicates with a conventional vacuum source (not shown) to provide suction through the vacuum ports 60, 62, 64.

The unformed film 12' is shaped by bending it over the form 42. The unformed film 12' is typically provided in a roll (not shown). It is unwound, trimmed if necessary to a proper size, and then heated until it is easily deformable. The heated film 12' is then laid over the form 42 with its outer surface 16' facing away from the pattern block 30 and pulled against the upper surface 44 and into the re-entrant grooves 46, 48 of the form 42 by the suction through the vacuum ports 60, 62, 64. As it cools, the film 12' hardens over the form 42 so that the hardened shaped film 12" (FIG. 4) conforms to the contour of the upper surface 44 and the re-entrant grooves 46, 48 of the form 42. The upper surface 44 of the form defines the convex contour of the exposed portion 82 of the film laminate 12 (FIGS. 2 and 4), while the re-entrant grooves 46, 48 of the form 42 define inwardly-curving portions 86, 88 of the shaped film 12".

As illustrated in FIG. 4, the shaped film 12" is then trimmed at an angle along cut lines 90, 92 by conventional means to separate the film laminate 12. Preferably, the shaped film 12" is trimmed along the cut lines 90, 92 at an angle of approximately 45°, though the measure of the angle is not critical. The cut lines 90, 92 are positioned across the inwardly-curving portions 84, 86 of the shaped film 12" so that the trimming forms the re-entrant longitudinal edge portions 18, 20 (FIG. 5) of the film laminate 12.

Once the film laminate 12 is separated, it is placed in the mold 32 (FIGS. 5 and 6) to insert mold the plastic substrate 14. As shown in FIG. 5, the insert mold 32 consists of a male member 100 and a female member 102. The female member 102 includes a channel 104 shaped to receive the exposed portion 82 of the film laminate 12, while the male member includes a core 106 which cooperates with the channel 104 to define the mold cavity 34. Preferably, the outer surface 16 of the film laminate 12 faces the female member 102 and the re-entrant longitudinal edge portions 18, 20 of the film laminate 12 extend out of the channel 104 for contact with the male member 100 when the mold 32 is closed.

As shown in FIG. 6, the mold 32 is closed over the film laminate 12 and a molten thermoplastic or thermosetting resin (not shown) such as polypropylene or PVC is injected into the mold cavity 34 under pressure through a gate 108 in the core 104 by conventional means (not shown). The closing of the mold 32 combined with the pressure of the resin forces the film laminate 12 against the sides of the channel 104 and curls the re-entrant longitudinal edge portions 18, 20 of the film laminate 12 inwardly over the adjacent longitudinal edges 22, 24 of the solidifying plastic substrate 14. During the injection molding process, the male member 100 and the female member 102 meet along flat surfaces 110, 112, 114 and 116 and are securely clamped together by conventional means (not shown) to prevent leakage or flashing. The resin solidifies by cooling and then the mold 32 is broken to release the body side molding 10 in a conventional manner.

Figure 8:
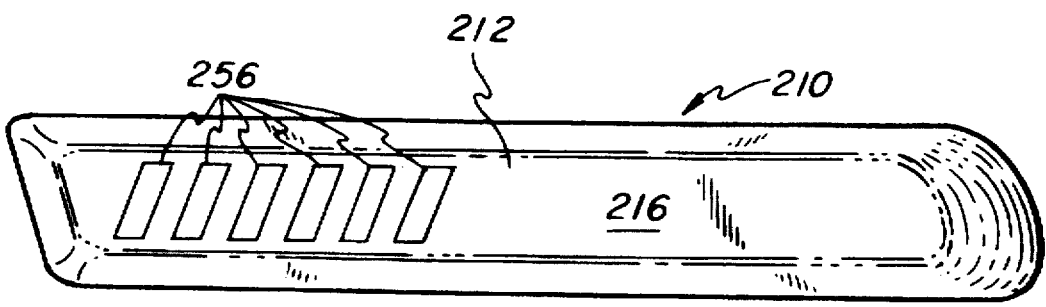
FIG. 8 is a plan view of a fused film-laminate part having a visible logo or design formed from a film laminate preformed as illustrated in FIG. 7.

FIGS. 7 and 8 illustrate a method of producing a fused film-plastic part 210 (FIG. 8) having a logo or design 256 visible against the outer surface 216 of the film laminate 112 (FIG. 8). As shown in FIG. 7, the unformed film 212' is supplied with a stencil or cut-outs 258 defining an image of the logo or design 256. (While the logo 256 shown in the drawings consists of a series of parallel lines, it may also consist of one or more words. The precise nature of the logo is not critical to the invention.) The unformed film 212' is aligned over a form 242 on a pattern block 230 identical to the pattern block 30 and form 42 of FIG. 3 such that the cut-outs 258 are positioned over the upper surface 244 of the form 242. The unformed film 212' is then shaped as described earlier in connection with FIG. 3. The resulting shaped film (not shown) has a cross-section identical to that of the shaped film 12" shown in FIG. 4. The resulting shaped film (not shown) is then trimmed as shown in FIG. 4 to produce a film laminate 212 (FIG. 8) having re-entrant longitudinal edge portions (not shown).

The film laminate 212 is then placed in a mold identical to that shown in FIGS. 5 and 6 and the body side molding 210 is insert molded as described in connection with FIGS. 5 and 6. The molten thermoplastic or thermosetting resin (not shown), which may include a dye or pigment for contrast with the film laminate 212, is gated into the mold (not shown) under pressure and flows into the cut-outs 258 (FIG. 7). Since the pressure of the resin presses the film laminate 212 against the wall of the mold cavity (not shown), the resin which flows into the cut-outs 258 (FIG. 7) solidifies flush with the outer surface 216 of the film laminate 212. Furthermore, since the solidified resin (not shown) has a color, and perhaps texture, different from that of the outer surface 216, the logo or design 256 is visible against the outer surface 216. As the resin is gated into the mold cavity (not shown), the re-entrant longitudinal edge portions (not shown) of the film laminate 212 are forced to curl over the adjacent edge portions of the plastic substrate (not shown) in the manner shown in FIG. 6 to ensure complete coverage of the plastic substrate (not shown) by the film laminate 212 when the plastic substrate solidifies.

Having described the invention in detail and by reference to preferred embodiments thereof, it will be apparent that modifications and variations are possible without departing from the scope of the appended claims. The invention is not limited to the fabrication of automotive parts, and is applicable to the fabrication of insert molded parts for other applications. Furthermore, the invention is not limited to the insert molding of molten thermoplastic or thermosetting resins, and is applicable to other prepolymer materials such as solvent-based prepolymer materials compatible with the film laminate and the insert molding technique.

What is claimed is:

1. A fused film-plastic part comprising:

a plastic substrate including first and second side portions defining first and second longitudinal edges; and a film laminate including a first re-entrant edge portion, said film laminate fused to said plastic substrate wherein said first re-entrant edge portion of said film laminate at least partially covers said first longitudinal edge of said plastic substrate.

2. The fused film-plastic part of claim 1 wherein said film laminate further includes a second re-entrant edge portion at least partially covering said second longitudinal edge of said plastic substrate.

3. The fused film-plastic part of claim 1 wherein said first re-entrant edge portion of said film laminate substantially covers said first longitudinal edge portion of said plastic substrate.

4. The fused film-plastic part of claim 1 wherein said second re-entrant edge portion of said film laminate substantially covers said second longitudinal edge portion of said plastic substrate.

5. The fused film-plastic part of claim 1 wherein said film laminate further includes a stencil of an image whereby a portion of said plastic substrate is visible through said stencil.

6. The fused film-plastic part of claim 1 wherein said plastic substrate comprises an injection molded thermoplastic or thermosetting resin.

7. The fused film-plastic part of claim 1 wherein said film laminate comprises an extruded thermoplastic backing sheet and a cast dried continuous paint coating disposed over said backing sheet.

8. A fused film-plastic part comprising:

a plastic substrate including first and second side portions defining first and second longitudinal edges; and a film laminate including first and second re-entrant edge portions, said film laminate fused to said plastic substrate wherein said first re-entrant edge portion of said film laminate substantially covers said first longitudinal edge of said plastic substrate and said second re-entrant edge portion of said film laminate substantially covers said second longitudinal edge of said plastic substrate.

* * * * *